(12) United States Patent
Druilhe et al.

(10) Patent No.: US 11,283,353 B2
(45) Date of Patent: Mar. 22, 2022

(54) POWER SUPPLY SYSTEM

(71) Applicants:STMicroelectronics S.r.l., Agrate Brianza (IT); STMicroelectronics (Alps) SAS, Grenoble (FR)

(72) Inventors: Francois Druilhe, Le Versoud (FR); Patrik Arno, Sassenage (FR); Alessandro Inglese, San Pietro Clarenza (IT); Michele Alessandro Carrano, Catania (IT)

(73) Assignees: STMICROELECTRONICS S.R.L., Agrate Brianza (IT); STMICROELECTRONICS (ALPS) SAS, Grenoble (FR)

( * ) Notice: Subject to any disclaimer, the term of this patent is extended or adjusted under 35 U.S.C. 154(b) by 161 days.

(21) Appl. No.: 16/385,284

(22) Filed: Apr. 16, 2019

(65) Prior Publication Data
US 2019/0319538 A1   Oct. 17, 2019

(30) Foreign Application Priority Data

Apr. 17, 2018 (FR) ...................................... 1853363

(51) Int. Cl.
*H02M 3/158* (2006.01)
*H02M 1/36* (2007.01)
*H02M 1/00* (2006.01)

(52) U.S. Cl.
CPC ............. *H02M 3/158* (2013.01); *H02M 1/36* (2013.01); *H02M 1/0045* (2021.05)

(58) Field of Classification Search
CPC ................... H02M 3/158; H02M 1/36; H02M 2001/0045; H02M 2001/007; H02J 1/102
See application file for complete search history.

(56) References Cited

U.S. PATENT DOCUMENTS

| 6,150,798 A | 11/2000 | Ferry et al. |
| 6,424,128 B1 * | 7/2002 | Hiraki ..................... G06F 1/26 |
| | | 323/268 |

(Continued)

FOREIGN PATENT DOCUMENTS

| CN | 101090467 A | 12/2007 |
| CN | 101222176 A | 7/2008 |

(Continued)

OTHER PUBLICATIONS

Merriam-Webster,"definition of Microcomputer," pp. 1-3 (Year: NA).*

(Continued)

*Primary Examiner* — Pinping Sun
(74) *Attorney, Agent, or Firm* — Slater Matsil, LLP (57) ABSTRACT

A power supply system includes a voltage application source, and a switched mode power supply having an output coupled to the voltage application source through a first path and through a second path different from the first path. A first node is coupled to the output of the switched mode power supply, the switched mode power supply being configured to couple the first node to the voltage application source through the first path in a first operating mode and through the second path in a different second operating mode. A digital regulator is coupled to the first node. A digital circuit is coupled to an output of the digital regulator. An analog regulator is coupled to the first node and an analog circuit coupled to an output of the analog regulator.

22 Claims, 6 Drawing Sheets

(56) References Cited

U.S. PATENT DOCUMENTS

| | | | | |
|---|---|---|---|---|
| 6,815,935 | B2* | 11/2004 | Fujii | H02M 3/157 323/272 |
| 7,057,378 | B2* | 6/2006 | Oyama | G05F 1/575 323/267 |
| 7,486,056 | B2* | 2/2009 | Shuey | H02M 3/156 323/266 |
| 9,063,714 | B1* | 6/2015 | Ryan | G06F 1/28 |
| 9,369,036 | B2* | 6/2016 | Hayes | H02M 1/36 |
| 9,627,967 | B2* | 4/2017 | Mallik | H02M 3/156 |
| 10,368,166 | B2* | 7/2019 | Renken | H04R 25/30 |
| 2005/0242792 | A1 | 11/2005 | Zinn | |
| 2007/0285122 | A1 | 12/2007 | Si et al. | |
| 2009/0010027 | A1* | 1/2009 | Nishikawa | H02M 3/33515 363/21.01 |
| 2009/0184700 | A1* | 7/2009 | Kanayama | H02M 3/158 323/282 |
| 2009/0295344 | A1* | 12/2009 | Qu | H02M 3/156 323/265 |
| 2013/0015833 | A1* | 1/2013 | George | H03K 17/063 323/311 |
| 2013/0162233 | A1 | 6/2013 | Marty | |
| 2014/0021930 | A1* | 1/2014 | Liu | H02M 3/1584 323/271 |
| 2014/0359332 | A1* | 12/2014 | Todeschini | G06F 1/3293 713/323 |
| 2015/0076906 | A1* | 3/2015 | Tamegai | H02M 3/156 307/31 |
| 2019/0319538 | A1 | 10/2019 | Druilhe et al. | |

FOREIGN PATENT DOCUMENTS

| | | |
|---|---|---|
| CN | 101447731 A | 6/2009 |
| CN | 209627238 U | 11/2019 |
| JP | 2015159642 A * | 9/2015 |

OTHER PUBLICATIONS

Merriam-Webster,"Definition of Microprocessor," pp. 1-3 (Year: NA).*

PCmag,"definition of sleep mode" pp. 1 (Year: NA) (Year: NA).*

Whatis,"definition of microcontroller," pp. 1-4 (Year: NA).*

* cited by examiner

POWER SUPPLY SYSTEM

CROSS-REFERENCE TO RELATED APPLICATIONS

This application claims priority to French Patent Application No. 1853363, filed on Apr. 17, 2018, which application is hereby incorporated herein by reference.

TECHNICAL FIELD

The present disclosure concerns a power supply, and in particular embodiments to power supply systems.

BACKGROUND

Various types of products include digital circuits and analog circuits, and more particularly analog radio wave transmit and/or receive circuits. These are for example all the devices (phones, tablets, printers, etc.) including a radio frequency connection (Bluetooth, wifi, etc.). Such products are often portable devices for which power consumption is a major issue.

Systems for powering such devices generally include DC/DC converters and linear regulators. Linear regulators ensure a fast voltage change at the level of the digital circuits without causing a major change on the analog circuits. DC/DC converters ensure the conservation of the supplied power while lowering or raising the voltage. They thus have a better efficiency than linear regulators. DC/DC converters however have a higher power consumption than linear regulators.

SUMMARY

A power supply system comprises a first node configured to be powered by a voltage application source through a switched-mode power supply coupled to the voltage application source, the switched-mode power supply configured to provide an output to the first node at a first output value coupled to the voltage application source and a second output value coupled to a chopped voltage from the voltage application source.

A method comprising executing a first operating mode of a power supply system comprising a first node configured to be powered either directly by a voltage application source or through a switched-mode power supply coupled to the voltage application source; digital circuits and analog circuits, wherein the first node is configured to supply power to the digital circuits and the analog circuits, and wherein the digital circuits comprise a memory and at least one of a logic circuit or a processing unit; and a first linear regulator coupled between the digital circuits and the first node. During the first operating mode, the first node is powered by the switched-mode power supply, the first linear regulator is operational, and the memory and the logic circuit are powered.

A power supply system includes a voltage application source, and a switched mode power supply having an output coupled to the voltage application source through a first path and through a second path different from the first path. A first node is coupled to the output of the switched mode power supply, the switched mode power supply being configured to couple the first node to the voltage application source through the first path in a first operating mode and through the second path in a different second operating mode. A digital regulator is coupled to the first node. A digital circuit is coupled to an output of the digital regulator. An analog regulator is coupled to the first node and an analog circuit coupled to an output of the analog regulator.

The foregoing and other features and advantages will be discussed in detail in the following non-limiting description of specific embodiments in connection with the accompanying drawings.

DETAILED DESCRIPTION OF ILLUSTRATIVE EMBODIMENTS

The same elements have been designated with the same reference numerals in the various drawings and, further, the various drawings are not to scale. For clarity, only those steps and elements which are useful to the understanding of the described embodiments have been shown and are detailed.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred to the orientation of the concerned elements in the drawings. Unless otherwise specified, the terms "approximately", "substantially", "about", and "in the order of" are used herein to designate a tolerance of plus or minus 10%, preferably of plus or minus 5%, of the value in question.

Unless otherwise specified, when reference is made to two elements connected together, this means that the elements are directly connected with no intermediate element other than conductors, and when reference is made to two elements coupled together, this means that the two elements may be directly coupled (connected) or coupled via one or a plurality of other elements.

The present disclosure concerns a power supply system for powering circuits, and in particular embodiments, circuits including a digital portion and an analog portion.

An embodiment provides a power supply system including a first node configured to be powered either directly by a voltage application source or through a switched-mode power supply. According to an embodiment, the switched-mode power supply is powered by the source. According to an embodiment, the first node is coupled to the output of the switched-mode power supply by an inductance. According to an embodiment, the node is configured to be powered by a power storage element. According to an embodiment, the power storage element is a capacitor coupled between the first node and a reference potential (e.g. circuit ground). According to an embodiment, the system powers digital circuits and analog circuits. According to an embodiment, the digital circuits include at least one memory and at least one logic circuit or one processing unit. According to an embodiment, the system includes a first linear regulator coupled between the digital circuits and the first node. According to an embodiment, the system includes a second linear regulator coupled between the source and the output node of the first regulator. According to an embodiment, the analog circuits include radio wave transmit and/or receive circuits. According to an embodiment, the system includes a third linear regulator coupled between the first node and the analog circuits. According to an embodiment, the system includes a first comparator configured to compare the value of the voltage supplied by the source with a first threshold. According to an embodiment, the system includes a second comparator configured to compare the voltage on the first node with a second threshold.

According to an embodiment, a method of using the previously-described system includes an operating mode where the first node is powered by the switched-mode power supply, where the first regulator is running, and where the at least one memory and one logic circuit are powered.

According to an embodiment, a method of using the previously-described system includes an embodiment where the first node is powered by the power storage element, the first regulator is not running, the second regulator is running, and the at least one memory and one logic circuit are powered.

According to an embodiment, a method of using the previously-described system includes an operating mode where the first node is powered by the powered storage element, the first regulator is not running, the second regulator is running, the at least one memory is powered, and the at least one logic circuit is not powered.

According to an embodiment, the starting of the system includes a step during which the first node is powered by the source, followed by a step during which the first node is powered by the output of the switched-mode power supply.

According to an embodiment, the starting of the system includes starting the source and launching the initialization of the switched-mode power supply. When the voltage supplied by the source is greater than the first threshold, connecting the node to the source. The starting further includes starting the first regulator. When the voltage at the input node of the first regulator is greater than the second threshold, starting the digital circuits. When the switched-mode power supply is initialized, connecting the first node to the output of the switched-mode power supply.

Figure 1:
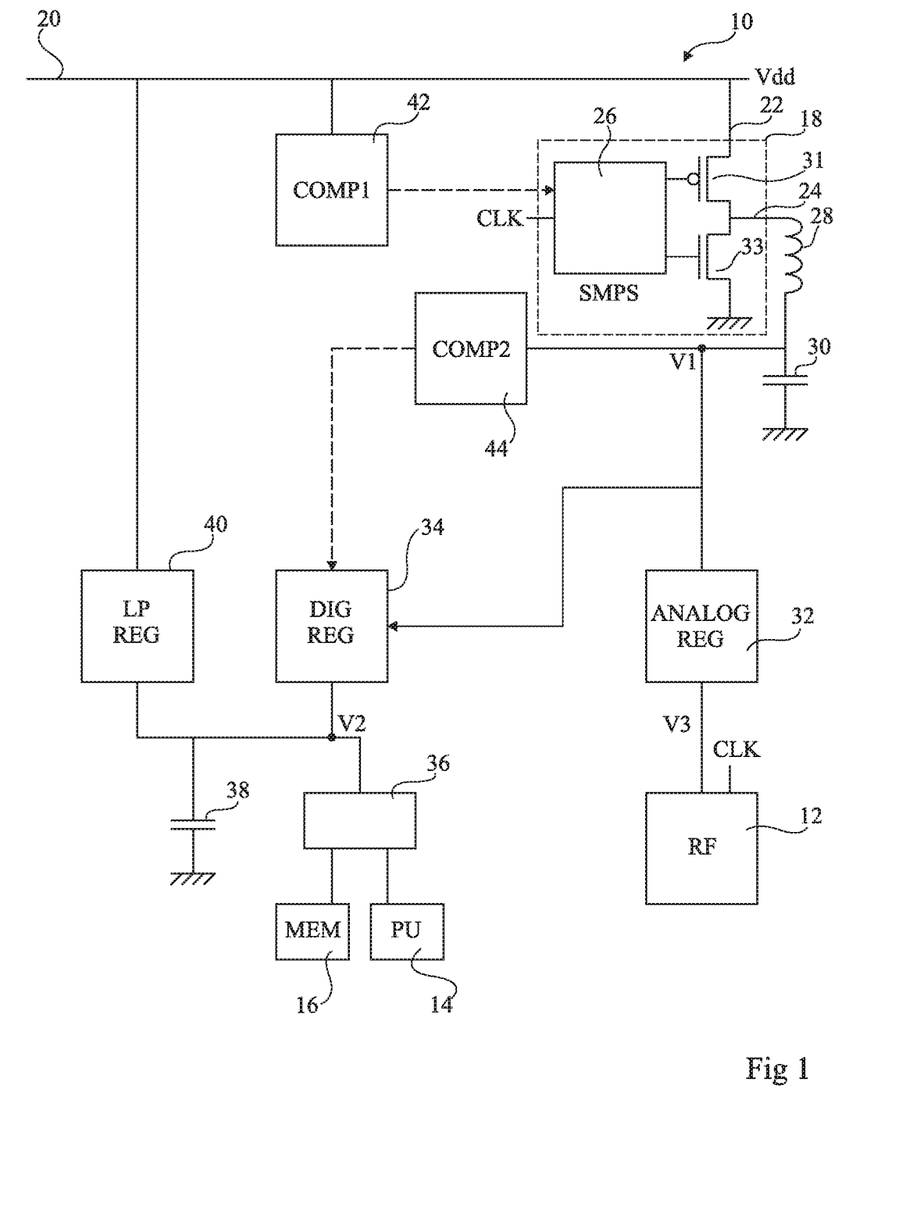
FIG. 1 is a simplified representation of an embodiment of a power supply system.

FIG. 1 is a simplified representation, in the form of blocks, of an embodiment of a power supply system 10. More specifically, the system powers analog circuits, for example, radio frequency transmit and/or receive circuits 12 (also shown in FIG. 1 as the block labelled RF). The system also powers digital circuits, for example, at least one processing unit 14 (PU) and/or logic circuits and at least one memory 16 (also shown in FIG. 1 as the block labelled MEM). Memory 16 may include one or a plurality of volatile memories and one or a plurality of non-volatile memories.

System 10 includes a DC/DC converter, for example, a switched-mode power supply 18 (also shown in FIG. 1 as the block labelled SMPS). Converter 18 is connected to a source of application of voltage Vdd shown as a rail 20. The converter thus receives at its input 22 voltage Vdd. The converter further receives a clock signal CLK.

A disadvantage of such a converter is that it requires a relatively long initialization period, for example, in the range from 10 to 100 µs, during which the output voltage is not sufficient to power the circuits.

Output 24 of converter 18 is coupled to a node V1 by an inductance 28. Node V1 is further coupled to ground by a capacitor 30. Capacitor 30 for example has a capacitance in the range from approximately 1 to 10 µF. Inductance 28 is for example in the range from 1 to 22 µH.

Converter 18 includes two switches 31 and 33 controlled by a control circuit 26. In the example of FIG. 1, switches 31 and 33 are MOS transistors, for example, of opposite types. Switch 31 is connected between input 22 and output 24, that is, between source 20 and inductance 28. Switch 33 is connected between the ground and output 24.

In normal operation of converter 18, the turning off and on of switches 31 and 33 is opposite and periodic. The voltage of source 20 is thus chopped, and made periodic, by converter 18. Output voltage 24 is thus alternately equal to the value of voltage Vdd and to the ground value. When switch 31 is on and switch 33 is off, the current is stored in inductance 28. When switch 33 is turned on and switch 31 is turned on, the diode of the MOS transistor forming switch 31 is used as a free wheel and the current displaces to node V1.

In certain operating modes, switch 31 may be held on and switch 33 may be held off to constantly couple node V1 to source 20. In other operating modes, switches 31 and 33 may be held off to electrically isolate inductance 28 from source 20, in which case node V1 is powered with the charge stored in capacitor 30.

Node V1 may thus be powered, according to the embodiment, by source 20, directly or in a way chopped by converter 18, or it may be powered by the charge storage in capacitor 30.

System 10 includes a linear regulator 32 (ANALOG REG) having its input connected to node V1 and having its output, supplying a voltage V3, connected to analog circuits 12. Circuits 12 also receive a clock signal, preferably the clock signal CLK received by converter 18 to decrease the analog disturbances generated by circuit 18.

As a variation, regulator 32 may be omitted. The analog circuits are then directly powered with the voltage of node V1.

System 10 further includes a regulator 34 (DIG REG) having its input connected to node V1 and having its output connected to a node V2. Node V2 is coupled to the digital circuits (memory 16 and logic circuit 14) by a circuit 36. Circuit 36 is for example formed of a plurality of switches and is configured to connect, or not, logic circuit 14 and memory 16 to node V2. Indeed, in certain operating modes, it may be desired to power the logic circuit and the memory and, in other operating modes, it may be desired to only power the memories, which may be volatile, to keep the stored data.

As a variation, node V2 may further be coupled to ground by a capacitor 38.

System 10 may also include a low-power linear regulator 40 (LP REG) having its input connected to source 20 and having its output connected to node V2.

The system further includes a comparator 42 (COMP1) configured to compare the value of the voltage supplied by source 20 to a first threshold. The first threshold is for example equal to 2.4 V for a source 20 configured to supply in normal operation a voltage of approximately 3.3 V. The result of this comparison may be used to determine whether voltage Vdd is sufficiently high for the starting of converter 18 to be advantageous. Indeed, the use of converter 18 consumes more power than a linear regulator to enable to modify the voltage while keeping the power received at the input. If voltage Vdd is smaller than the first threshold and the voltage decrease to be achieved is low, the use of converter 18 is not efficient in terms of energy and it is preferable to stop converter 18.

System 10 further includes a comparator 44 (COMP2) configured to compare the voltage value on node V1 with a second threshold. The second threshold is for example substantially equal to 1.4 V. The result of this comparison may be used to determine whether regulator 34 can be started, that is, whether the voltage on node V1 can enable the operation of the digital circuits.

Figure 2:
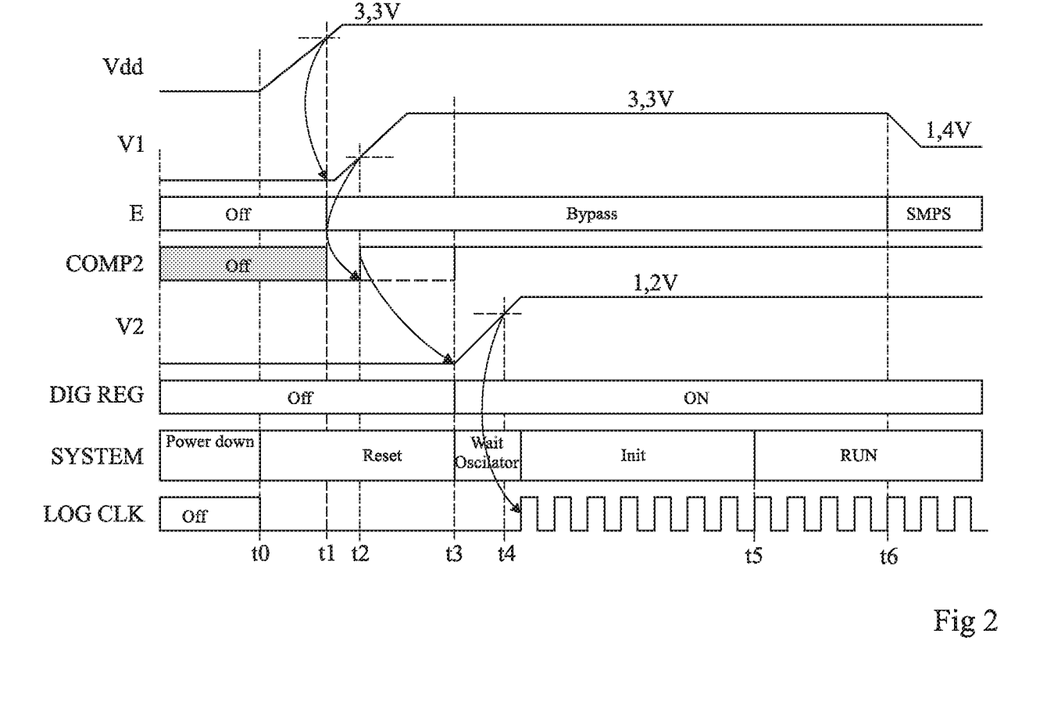
FIG. 2 is a timing diagram illustrating the starting of the system of FIG. 1.

FIG. 2 is a timing diagram illustrating the starting of the system of FIG. 1. The timing diagram of FIG. 2 and those of the next drawings show examples of variations of:
  the voltage Vdd supplied by source 20;
  the voltage on node V1, designated hereafter by expression "voltage V1";
  a state E of converter 18;
  the result of comparator 44 (COMP2), which takes a high state when voltage V1 is above the second threshold and a low state when voltage V1 is below the second threshold;
  the voltage on node V2, designated hereafter with expression "voltage V2";
  the state of linear regulator 34 (DIG REG);
  the state of the system (SYSTEM); and
  the clock signal of the digital circuits (LOG CLK).

Before a time to, the system is powered down and all the components are turned off. In particular, voltages Vdd, V1, and V2 are zero, inductance 28 is isolated from source 20 and from converter 18 and the outputs of comparators 42 and 44 are at a high impedance. At time to, source 20 is turned on, voltage Vdd then starts increasing and the system enters in initialization mode (Reset). Further, clock signal LOG CLK takes a zero value and the outputs of comparator 42 are no longer at high impedance.

At a time t1, voltage Vdd reaches the first threshold. This is detected by comparator COMP1. This information is used by converter 18, which connects inductance 28 to source 20 (Bypass) by maintaining switch 31 on and switch 33 off. Node V1 is thus directly powered by source 20 and voltage V1 increases. Capacitor 30 is also charged. Further, the outputs of comparator 44 are no longer at high impedance.

At a time t2, voltage V1 reaches the second threshold. Comparator COMP2 then takes the high value. After a delay, for example, caused by the initialization time of regulator 34, voltage V2 starts increasing (time t3). This concludes the system initialization (Reset) which then enters a waiting period (Wait Oscillator), corresponding to the initialization time of the clock of the digital circuits. At a time t4, voltage V2 reaches the minimum value for the operation of the digital circuits and clock signal LOG CLK becomes non constant, which means that the digital circuit can run. Voltage V2 keeps on increasing to reach the voltage desired at the output of regulator 34, here, for example, 1.2 V. Voltage V2 may vary during the operation without modifying either voltage V1, or the output voltage (V3) of regulator 32, and may for example take value 1.0 V.

At the first clock pulse of signal LOG CLK, the system enters a period of initialization of the digital circuits (Init). At the end of this initialization (time t5), the digital circuits are running (RUN). At a time t6, an instruction, for example originating from the user or from a program, orders converter 18 to stop holding switches 31 and 33 and to start operating normally again. The value of voltage V1 thus decreases by the value of the voltage directly supplied by source 20 (here, for example, 3.3 V) down to the value of the chopped voltage supplied at output 24 by converter 18 (here, for example, 1.4 V). The system is in a normal operating state (RUN), that is, the logic circuit and the memory are sufficiently powered to run, node V1 is powered by converter 18 and node V2 is powered by regulator 34.

The instruction occurs for example on demand of processing unit 14, when the latter needs to perform a power consuming operation or to activate a task performed by RF circuits 12.

An advantage of the described embodiment is that it is possible for the digital circuits to be running before the end of the period of initialization of converter 18. During this period, between times t5 and t6, the power supply is however less efficient than after time t6 from which V1 is powered by converter 18. The duration between times t5 and t6 is for example in the range from 1 µs to several milliseconds, for example, between 1 µs and 5 ms.

Figure 3:
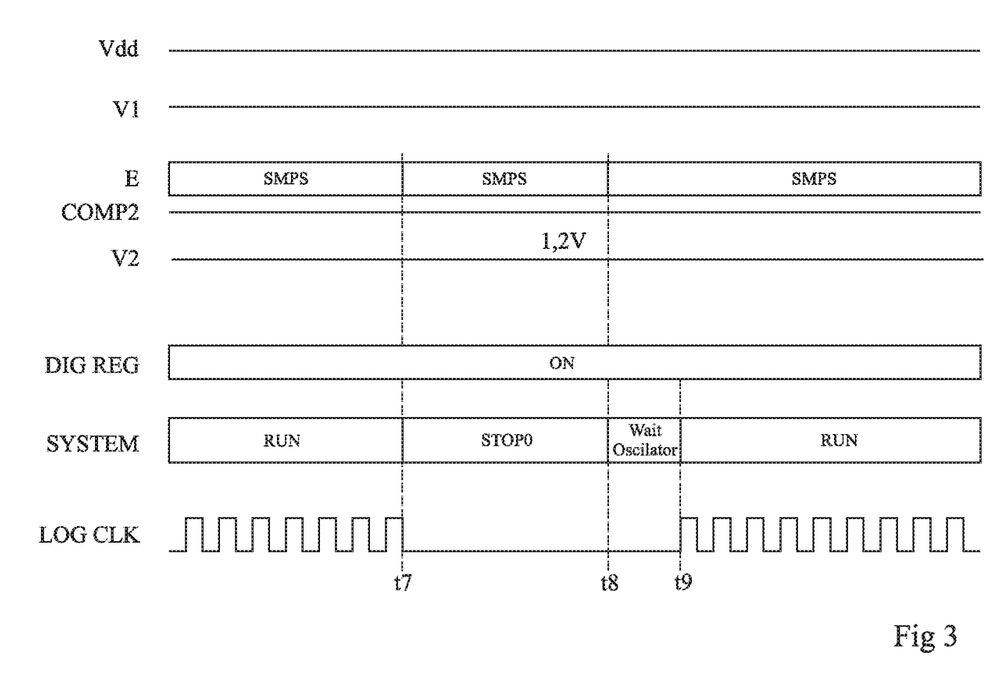
FIG. 3 is a timing diagram illustrating an operating mode of the system of FIG. 1.

FIG. 3 is a timing diagram illustrating an operating mode of the system of FIG. 1.

At a time t7, for example following time t6, the system switches to a first so-called low-consumption operating mode (STOP0), that is, an operating mode which consumes less power than the normal operating mode into which the system enters at time t6. In the first low-consumption operating mode, processing unit 14 (and/or the possible logic circuits) are no longer running, which is shown by the resetting of clock signal LOG CLK, but are still powered. Converter 18 and regulator 34 are running and the volatile memories are still powered.

At a time t8, the system prepares to leave the first low-consumption operating mode by starting the initialization of the clock of the digital circuits. After the waiting period (Wait Oscillator), corresponding to the initialization time, the system is again (time t9) in normal operation (RUN).

Figure 4:
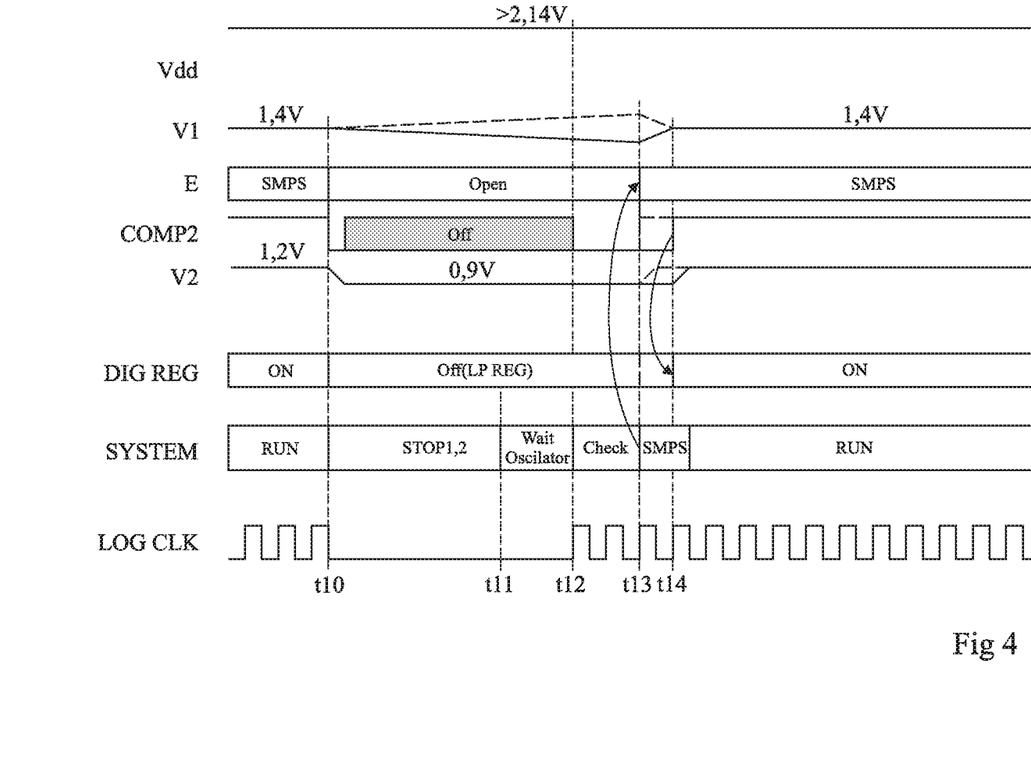
FIG. 4 is a timing diagram illustrating another operating mode of the system of FIG. 1.

FIG. 4 is a timing diagram illustrating another embodiment of the system of FIG. 1.

At a time no, for example following time t9 or time t6, the system switches to a second (STOP1) or a third (STOP2) low consumption operating mode. To achieve this, switch 31 of converter 18 is maintained off and switch 33 of converter 18 is maintained off. Inductance 28 is thus isolated from source 20 and from the output of converter 18 (Open). Node V1 is thus powered with the charge stored in capacitor 30. Because of the parasitic elements of the power supply, such as protection diodes, not shown, as well as the leakage resistance of capacitor 30, a decrease in voltage V1 can be observed. The same phenomena may possibly cause an increase in voltage V1 (voltage curve V1 shown in dotted lines) in the case where there are leaks in the rest of the system, which charge capacitor 30.

The output of comparator 44 (COMP2) is at high impedance (Off), in the same way as the output of comparator 42 (COMP1), that is, they are stopped to avoid consuming power. Regulator 34 is also turned off at time t10 (Off(LP REG)). Node V2 is then powered by regulator 40 (LP REG) which receives at its input the voltage Vdd supplied by source 20 (for example, 3.3 V) and outputs a voltage for example smaller than voltage V2 supplied by regulator 34 in normal operation. For example, in normal operation, voltage V2 is substantially equal to 1.2, and in modes STOP1 and STOP2, voltage V2 is substantially equal to 0.9 V.

In the second and third low-consumption operating modes, memory 16 is powered. Processing unit 14 (and/or the possible logic circuits) is no longer running, which is shown by the setting to zero of clock signal LOG CLK. In the second low consumption operating mode, processing unit 14 (and/or the possible logic circuits) is however powered, which is not the case in the third operating mode.

At a time t11, the system prepares to leave the second or the third operating mode to return to the normal operating mode. The initialization of the clock of the digital circuits (Wait Oscillator) thus starts at this time t11 and ends at a time t12. At time t12, the digital circuits are running again and comparators 42 and 44 (COMP1 and COMP2) are turned on. Comparator 42 (COMP1) checks (Check) whether voltage Vdd is greater than the first threshold (here, for example, 2.14 V) and that converter 18 (SMPS) can run normally.

At a time t13, inductance 28 is no longer isolated from converter 18 and node V1 is powered through converter 18 (SMPS). Voltage V1 will thus come closer, by increasing or by decreasing, to the value of the output voltage of converter 18 (here, for example, 1.4 V).

Further, at time t13, comparator 44 (COMP2) compares the value of voltage V1 with the second threshold.

If voltage V1 is smaller than this second threshold (full line), the system waits for a time t14 at which voltage V1 reaches the second threshold before starting regulator 34 (DIG REG) and turning off regulator 40 (LP REG). Voltage V2 increases, from time t14, to reach a normal operating value, for example, 1.2 V. The system is then in normal operation (RUN).

If voltage V1 is greater than the second threshold (dotted lines), regulator 34 is directly turned on and regulator 40 is directly turned off. Voltage V2 thus starts increasing from as soon as time t13.

Figure 5:
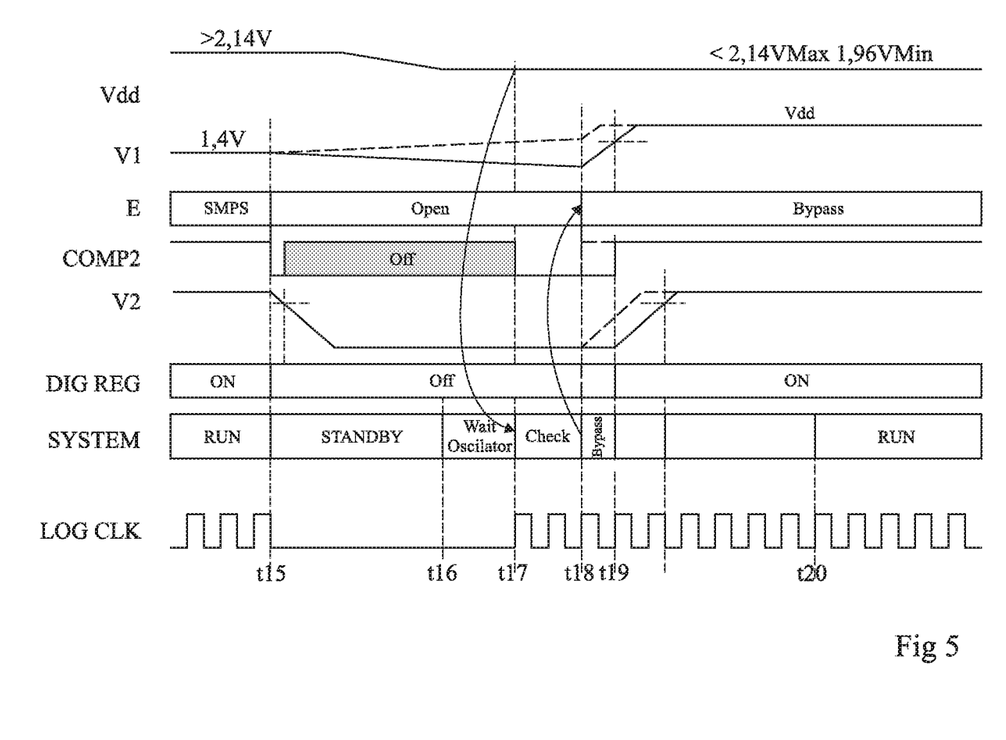
FIG. 5 is a timing diagram illustrating another operating mode of the system of FIG. 1.

FIG. 5 is a timing diagram illustrating another operating mode of the system of FIG. 1.

At a time t15, which may for example follow time t6, t9, or t14, the system enters a fourth low-consumption operating mode (STANDBY). In this operating mode, switches 31 and 33 are maintained off to isolate inductance 28 from source 20 and from converter 18 (Open). Voltage V1 thus starts increasing or decreasing as previously described. Comparators 42 and 44 (COMP1 and COMP2) are turned off, as well as regulators 34 (DIG REG) and 40 (LP REG). Voltage V2 thus decreases down to zero and the digital circuits are turned off. Certain components, not shown in FIG. 1, may be turned on during this period, for example, a 32-kHz oscillator (LES), a counter forming a real time clock (RTC), as well as a portion of the memory (32 kByte) which is maintained.

At a time t16, the initialization of the clock of the digital signals (Wait Oscillator) starts. The initialization ends at a time t17, at which comparators COMP1 and COMP2 are turned on and at which the digital circuits are running again.

Between time t17 and a time t18, comparator COMP1 compares (Check) the value of the voltage supplied by source 20 with the first threshold. In the example of FIG. 5, the comparator determines that voltage Vdd has decreased between time t15 and time t17. Voltage Vdd is for example in the range from 1.96 V to 2.14 V.

At time t18, switch 31 is turned on and switch 33 is held off, to supply node V1 directly through source 20 (Bypass). Voltage V1 is then compared by comparator COMP2 with the second threshold.

If voltage V1 is smaller than the second threshold (full line), the system waits for a time t19 at which voltage V1 reaches the second threshold before starting regulator 34 (DIG REG). Voltage V2 then starts increasing to reach the normal operating voltage value, for example, 1.2 V.

If voltage V1 is greater than the second threshold (dotted lines), regulator 34 is directly turned on and voltage V2 directly starts increasing to reach the normal operating voltage value.

In both cases, voltage V1 increases (in the example of FIG. 5) or decreases to reach the value of voltage Vdd supplied by source 20.

At a time t20, the system is reset and the digital circuits can run normally (RUN).

Figure 6:
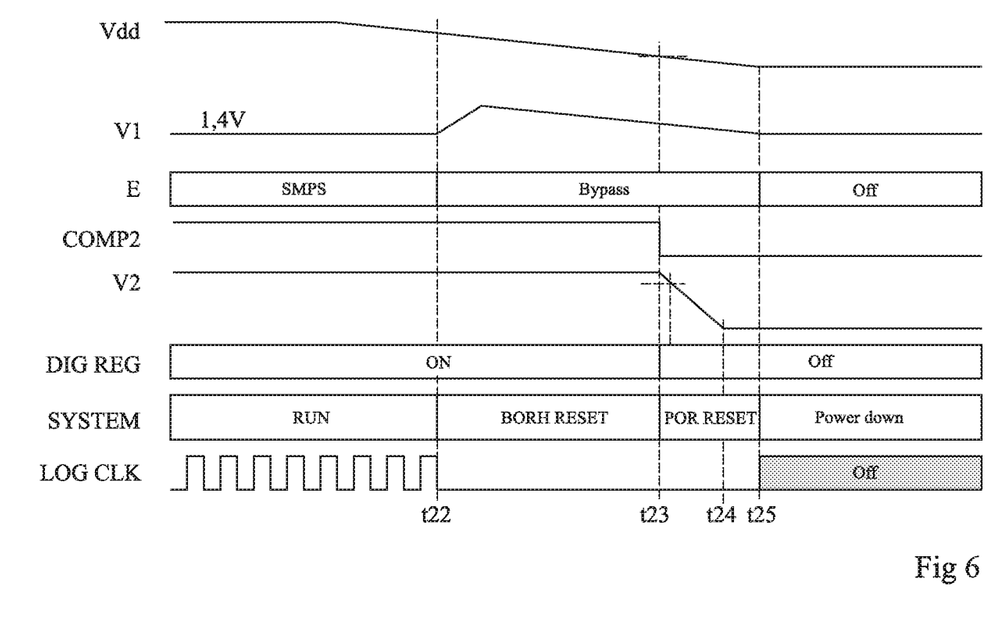
FIG. 6 is a timing diagram illustrating another operating mode of the system of FIG. 1.

FIG. 6 is a timing diagram illustrating another embodiment of the system of FIG. 1.

At a time t22 (BORH RESET) which may for example follow time t6, t9, or t14, voltage Vdd supplied by source 20 decreases below the first threshold. Such a voltage decrease is for example due to the turning off of source 20 or to a malfunction of source 20.

Processing unit 14 (and/or the possible logic circuits) is turned off. Switch 31 is held on and switch 33 is held off to directly power node V1 from source 20 (Bypass). The value of voltage V1 will thus progressively become equal to the voltage supplied by source 20.

At a time t23 (POR RESET), comparator COMP1 determines that the voltage Vdd supplied by source 20 (and voltage V1) is smaller than a third threshold, for example substantially equal to 1.7 V. Regulator 34 is then turned off and voltage V2 decreases to become zero at a time t24.

At a time t25, the voltage Vdd supplied by the source becomes zero and the system is turned off (Off, Power down).

Specific embodiments have been described. Various alterations, modifications, and improvements will occur to those skilled in the art. In particular, capacitor 30 may be replaced with another type of power storage element.

Various embodiments with different variations have been described hereabove. It should be noted that those skilled in the art may combine various elements of these various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting.

What is claimed is:

1. A method comprising:
    executing a first operating mode of a power supply system comprising:
        a first node;
        a switched-mode power supply coupled to a voltage application source, the switched-mode power supply comprising a first comparator configured to switch a power source at the first node between the voltage application source or an output of the switched-mode power supply, the first node being powered by the switched-mode power supply in response to determining, by the first comparator, that a voltage value at the voltage application source is greater than a first threshold voltage;
        a digital circuit and an analog circuit, wherein the first node is configured to supply power to each of the digital circuit and the analog circuit in the first operating mode, and wherein the digital circuit comprises a memory and at least one of a logic circuit or a processor;
        a digital linear regulator coupled between the digital circuit and the first node;
        a linear regulator coupled between the voltage application source and an output node of the digital linear regulator,
    wherein, during the first operating mode, the first node is powered by the switched-mode power supply, the digital linear regulator is operational, the memory is powered ON, and the at least one of the logic circuit or the processor is powered ON, wherein, during a second operating mode, the first node is powered by a power storage circuit coupled between the first node and a reference potential, the digital linear regulator is non-operational, the linear regulator is running, the memory is powered ON, and the at least one of the logic circuit or the processor is powered ON, and wherein, during a third operating mode, the first node is powered by the power storage circuit, the digital linear regulator is non-operational, the linear regulator is operational, the memory is powered ON, and the at least one of the logic circuit or the processor is powered OFF; and a second comparator circuit configured to, in the first operating mode, enable the digital linear regulator in response to determining that a voltage value at the first node is greater than a second threshold voltage.

2. The method of claim 1, further comprising starting the power supply system, the starting of the power supply system comprising a step during which the first node is powered by the voltage application source, followed by a step during which the first node is powered by the output of the switched-mode power supply.

3. The method of claim 2, wherein starting the power supply system comprises:
starting the voltage application source;
launching an initialization of the switched-mode power supply;
connecting the first node to the voltage application source in response to a voltage supplied by the voltage application source being greater than the first threshold voltage;
starting the digital linear regulator;
starting the digital circuit in response to a voltage at an input node of the digital linear regulator being greater than the second threshold voltage; and
connecting the first node to the output of the switched-mode power supply in response to the switched-mode power supply being initialized.

4. The method of claim 1, wherein the power storage circuit is a capacitor coupled between the first node and the reference potential.

5. The method of claim 1, wherein the analog circuit comprises a radio wave transmit circuit or a radio wave circuit.

6. The method of claim 1, wherein the first node is coupled to the output of the switched-mode power supply through an inductor.

7. The method of claim 1, wherein the first threshold voltage is greater than the second threshold voltage.

8. A power supply system comprising:
a voltage application source;
a switched-mode power supply comprising a first comparator, the switched-mode power supply coupled to the voltage application source, the switched-mode power supply configured to, in a first operating mode of the power supply system, provide power at a first node of the power supply system in response to determining, by the first comparator, that a voltage value at the voltage application source is greater than a first threshold voltage;
a digital circuit comprising a memory, and at least one of a logic circuit or a processor, the digital circuit coupled to the first node of the power supply system;

an analog circuit coupled to the first node of the power supply system;
a digital linear regulator coupled between the digital circuit and the first node, wherein, during the first operating mode of the power supply system, the digital linear regulator is operational, the memory is powered ON, and the at least one of the logic circuit or the processor is powered ON;
a second comparator circuit coupled between the first node and the digital linear regulator, the second comparator circuit configured to, in the first operating mode, enable the digital linear regulator based on determining that a voltage value at the first node is greater than a second threshold voltage;
a power storage circuit coupled between the first node and a reference potential, wherein the power storage circuit is configured to, in a second operating mode of the power supply system, provide power at the first node, and wherein, during the second operating mode of the power supply system, the digital linear regulator is non-operational; and
a linear regulator coupled between the voltage application source and an output of the digital linear regulator, wherein, during the second operating mode of the power supply system, the linear regulator is operational, the memory is powered ON, and the at least one of the logic circuit or the processor is powered ON, and wherein the power storage circuit is configured to, in a third operating mode of the power supply system, provide power at the first node, the digital linear regulator is non-operational, the linear regulator is operational, the memory is powered ON, and the at least one of the logic circuit or the processor is powered OFF.

9. The power supply system of claim 8, wherein the power supply system is configured to, during a startup of the power supply system, power the first node by the voltage application source at a first step and power the first node by the switched-mode power supply at a second step following the first step.

10. The power supply system of claim 8, wherein a startup of the power supply system comprises:
starting the voltage application source;
launching an initialization of the switched-mode power supply;
connecting the first node to the voltage application source and starting the digital linear regulator in response to a voltage supplied by the voltage application source being greater than the first threshold voltage;
starting the digital circuit in response to a voltage at an input node of the digital linear regulator being greater than the second threshold voltage; and
connecting the first node to an output of the switched-mode power supply in response to the switched-mode power supply being initialized.

11. The power supply system of claim 8, further comprising an inductance coupled between the first node and an output of the switched-mode power supply.

12. The power supply system of claim 8, wherein the power storage circuit is a capacitor coupled between the first node and the reference potential.

13. The power supply system of claim 8, wherein the first threshold voltage is greater than the second threshold voltage.

14. The power supply system of claim 8, wherein the analog circuit comprises a radio wave transmit circuit or a radio wave circuit.

15. A method comprising:
having a power supply system comprising a voltage application source, a switched-mode power supply, a digital linear regulator, a linear regulator, a power storage circuit, a comparator circuit, a digital circuit, and an analog circuit, wherein the digital circuit comprises a memory, and at least one of a logic circuit or a processor;
comparing, by the comparator circuit, a voltage value at a first node of the power supply system to a threshold voltage, and, operating the power supply system in a first operating mode or a second operating mode based on determining that the voltage value at the first node is, respectively, less than or greater than the threshold voltage;
operating the power supply system in a first operating mode, the first operating mode comprising:
powering the first node of the power supply system either directly by the voltage application source or through the switched-mode power supply coupled to the voltage application source,
supplying power to the digital circuit and the analog circuit through the first node, and powering the digital linear regulator, the memory, and the at least one of the logic circuit or the processor;
operating the power supply system in a second operating mode, the second operating mode comprising:
powering the first node through the power storage circuit,
supplying power to the digital circuit via the linear regulator,
supplying power to the analog circuit through the first node, and
powering the linear regulator, the memory and the at least one of the logic circuit or the processor, wherein the digital linear regulator is non-operational; and
operating the power supply system in a third operating mode, the third operating mode comprising:
powering the first node through the power storage circuit,
supplying power to the digital circuit via the linear regulator,
supplying power to the analog circuit through the first node, and
powering the linear regulator and the memory, wherein the at least one of the logic circuit or the processor is powered OFF, and wherein the digital linear regulator is non-operational.

16. The method of claim 15, further comprising starting the power supply system, the starting of the power supply system comprising a step during which the first node is powered by the voltage application source, followed by a step during which the first node is powered by an output of the switched-mode power supply.

17. The method of claim 16, wherein starting the power supply system comprises:
starting the voltage application source;
launching an initialization of the switched-mode power supply;
connecting the first node to the voltage application source in response to a voltage supplied by the voltage applications source being greater than a first threshold voltage;
starting the digital linear regulator;
starting the digital circuit in response to a voltage at an input node of the digital linear regulator being greater than a second threshold voltage; and
connecting the first node to the output of the switched-mode power supply in response to the switched-mode power supply being initialized.

18. The method of claim 17, wherein the first threshold voltage is greater than the second threshold voltage.

19. The method of claim 15, wherein the power storage circuit is a capacitor coupled between the first node and a reference potential.

20. The method of claim 15, wherein the first node is coupled to an output of the switched-mode power supply through an inductor.

21. The method of claim 15, wherein the analog circuit comprises a radio wave transmit circuit or a radio wave circuit.

22. The method of claim 15, wherein the first node is coupled to an output of the switched-mode power supply through an inductor.

* * * * *